(12) United States Patent
Crites et al.

(10) Patent No.: US 9,394,798 B2
(45) Date of Patent: Jul. 19, 2016

(54) GAS TURBINE ENGINES WITH TURBINE AIRFOIL COOLING

(71) Applicant: HONEYWELL INTERNATIONAL INC., Morristown, NJ (US)

(72) Inventors: Daniel Cregg Crites, Mesa, AZ (US); Mark C. Morris, Phoenix, AZ (US); Lorenzo Crosatti, Phoenix, AZ (US); Ardeshir Riahi, Scottsdale, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 517 days.

(21) Appl. No.: 13/855,417

(22) Filed: Apr. 2, 2013

(65) Prior Publication Data

US 2015/0082808 A1 Mar. 26, 2015

(51) Int. Cl.
*F01D 5/18* (2006.01)

(52) U.S. Cl.
CPC ............... *F01D 5/187* (2013.01); *F01D 5/186* (2013.01); *F05D 2220/32* (2013.01); *F05D 2240/121* (2013.01); *F05D 2250/231* (2013.01); *F05D 2250/232* (2013.01); *F05D 2260/201* (2013.01); *Y02T 50/671* (2013.01); *Y02T 50/676* (2013.01)

(58) Field of Classification Search
CPC ... F01D 5/186; F01D 5/187; F05D 2240/121; F05D 2250/232; F05D 2260/207; F05D 2250/231; F05D 2260/201; F05D 2220/32; Y02T 50/676; Y02T 50/671
See application file for complete search history.

(56) References Cited

U.S. PATENT DOCUMENTS

| | | | |
|---|---|---|---|
| 5,271,715 A | 12/1993 | Zelesky et al. | |
| 5,690,473 A * | 11/1997 | Kercher | F01D 5/183 415/115 |
| 7,137,781 B2 * | 11/2006 | Harvey | F01D 5/187 415/115 |
| 7,281,895 B2 * | 10/2007 | Liang | F01D 5/187 416/97 R |
| 2002/0168264 A1 * | 11/2002 | Weigand | F01D 5/187 416/97 R |
| 2005/0111981 A1 | 5/2005 | Davison et al. | |
| 2009/0074575 A1 * | 3/2009 | Propheter-Hinckley | F01D 5/186 416/95 |
| 2009/0317258 A1 | 12/2009 | Tibbott et al. | |
| 2010/0303635 A1 | 12/2010 | Townes et al. | |
| 2011/0189015 A1 * | 8/2011 | Shepherd | F01D 5/186 416/95 |

FOREIGN PATENT DOCUMENTS

JP 2012-202335 A 10/2012

* cited by examiner

*Primary Examiner* — Carlos A Rivera
(74) *Attorney, Agent, or Firm* — Ingrassia Fisher & Lorenz, P.C.

(57) ABSTRACT

An airfoil for a gas turbine engine is provided. The airfoil includes a body with a leading edge, a trailing edge, a first side wall extending between the leading edge and the trailing edge, and a second side wall extending between the leading edge and the trailing edge. The body defines an interior cavity. The airfoil includes an interior wall disposed within the interior cavity of the body and extending between the first wall and the second wall to define a supply chamber and a leading edge chamber. The interior wall defines a cooling hole with a base portion and a locally extended portion to direct cooling air from the supply chamber to the leading edge chamber such that the cooling air impinges upon the leading edge.

14 Claims, 8 Drawing Sheets

FIG. 12

GAS TURBINE ENGINES WITH TURBINE AIRFOIL COOLING

TECHNICAL FIELD

The present invention generally relates to gas turbine engines, and more particularly relates to gas turbine engines with improved turbine airfoil cooling.

BACKGROUND

Gas turbine engines are generally used in a wide range of applications, such as aircraft engines and auxiliary power units. In a gas turbine engine, air is compressed in a compressor, and mixed with fuel and ignited in a combustor to generate hot combustion gases, which flow downstream into a turbine section. In a typical configuration, the turbine section includes rows of airfoils, such as stator vanes and rotor blades, disposed in an alternating sequence along the axial length of a generally annular hot gas flow path. The rotor blades are mounted at the periphery of one or more rotor disks that are coupled in turn to a main engine shaft. Hot combustion gases are delivered from the engine combustor to the annular hot gas flow path, thus resulting in rotary driving of the rotor disks to provide an engine output.

Due to the high temperatures in many gas turbine engine applications, it is desirable to regulate the operating temperature of certain engine components, particularly those within the mainstream hot gas flow path in order to prevent overheating and potential mechanical issues attributable thereto. As such, it is desirable to cool the airfoils of the rotor blades and stator vanes to prevent or reduce adverse impact and extend useful life. Mechanisms for cooling turbine airfoils include ducting cooling air through internal passages and then venting the cooling air through holes formed in the airfoil. Internal and film cooling techniques attempt to maintain temperatures that are suitable for material and stress level. However, given the high temperature of engine operation, cooling remains a challenge, particularly in areas such as the airfoil leading edge. The leading edge of the turbine airfoil may be subject to the highest heat load on the airfoil, which may result in oxidation and thermo-mechanical fatigue.

Accordingly, it is desirable to provide gas turbine engines with improved airfoil cooling. Furthermore, other desirable features and characteristics of the present invention will become apparent from the subsequent detailed description of the invention and the appended claims, taken in conjunction with the accompanying drawings and this background of the invention.

BRIEF SUMMARY

In accordance with an exemplary embodiment, an airfoil for a gas turbine engine includes a body with a leading edge, a trailing edge, a first side wall extending between the leading edge and the trailing edge, and a second side wall extending between the leading edge and the trailing edge. The body defines an interior cavity. The airfoil includes an interior wall disposed within the interior cavity of the body and extending between the first wall and the second wall to define a supply chamber and a leading edge chamber. The interior wall defines a cooling hole with a base portion and a locally extended portion to direct cooling air from the supply chamber to the leading edge chamber such that the cooling air impinges upon the leading edge.

In accordance with another exemplary embodiment, a gas turbine engine includes a compressor section configured to receive and compress air; a combustion section coupled to the compressor section and configured to receive the compressed air, mix the compressed air with fuel, and ignite the compressed air and fuel mixture to produce combustion gases; and a turbine section coupled to the combustion section and configured to receive the combustion gases. The turbine section defines a combustion gas path and includes a turbine rotor positioned within the combustion gas path. The turbine rotor includes a platform at least partially defining the combustion gas path; and an airfoil extending from the platform. The airfoil includes a leading edge, a trailing edge, and side walls defining an interior cavity. The airfoil further includes an interior wall disposed within the interior cavity of the body and extending between the side walls to define a supply chamber and a leading edge chamber. The interior wall defines a cooling hole with a base portion and a locally extended portion to direct cooling air from the supply chamber to the leading edge chamber such that the cooling air impinges upon the leading edge.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. Furthermore, there is no intention to be bound by any theory presented in the preceding background or the following detailed description.

Broadly, exemplary embodiments discussed herein include gas turbine engines with turbine components having improved cooling characteristics. In particular, exemplary embodiments include turbine airfoils with cooling holes formed in an interior wall that direct cooling jets to impinge onto an inner surface of the leading edge. Each cooling hole may include a locally extended portion that improves directionality and mitigates or prevents cross flow, thus providing more efficient and/or improved cooling characteristics. The locally extended portion may be a conical structure, cylindrical structure, and/or scoop structure.

Figure 1:
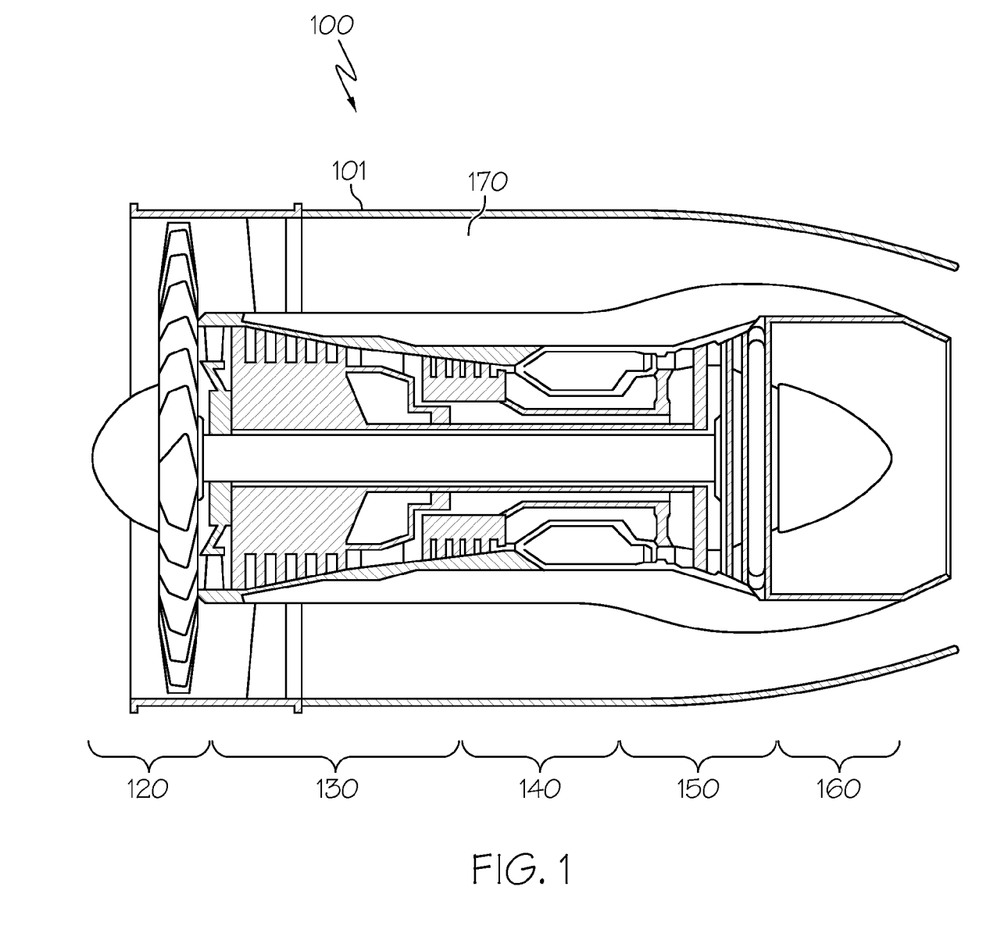
FIG. 1 is a partial cross-sectional view of a gas turbine engine in accordance with an exemplary embodiment.

FIG. 1 is a cross-sectional view of a gas turbine engine 100 according to an exemplary embodiment. Although FIG. 1 depicts a turbofan engine, in general, exemplary embodiments discussed herein may be applicable to any type of engine, including turboshaft engines. The gas turbine engine 100 may form part of, for example, an auxiliary power unit for an aircraft or a propulsion system for an aircraft. The gas turbine engine 100 has an overall construction and operation that is generally understood by persons skilled in the art. The gas turbine engine 100 may be disposed in an engine case 101 and may include a fan section 120, a compressor section 130, a combustion section 140, a turbine section 150, and an exhaust section 160. The fan section 120 may include a fan, which draws in and accelerates air. A fraction of the accelerated air from the fan section 120 is directed through a bypass section 170 to provide a forward thrust. The remaining fraction of air exhausted from the fan is directed into the compressor section 130.

The compressor section 130 may include a series of compressors that raise the pressure of the air directed into it from the fan section 120. The compressors may direct the compressed air into the combustion section 140. In the combustion section 140, the high pressure air is mixed with fuel and combusted. The combusted air is then directed into the turbine section 150. As described in further detail below, the turbine section 150 may include a series of rotor and stator assemblies disposed in axial flow series. The combusted air from the combustion section 140 expands through the rotor and stator assemblies and causes the rotor assemblies to rotate a main engine shaft for energy extraction. The air is then exhausted through a propulsion nozzle disposed in the exhaust section 160 to provide additional forward thrust.

Figure 2:
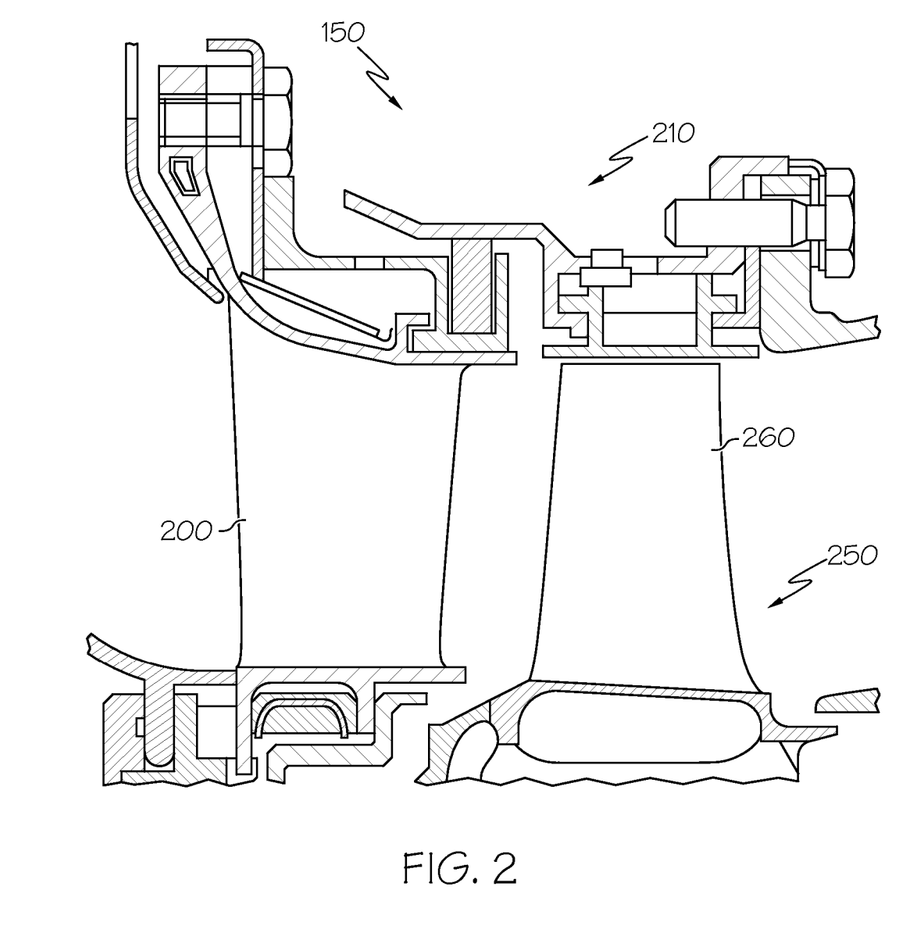
FIG. 2 is a partial, sectional elevation view illustrating a portion of a turbine section of the gas turbine engine of FIG. 1 in accordance with an exemplary embodiment.

FIG. 2 is a partial cross-sectional side view of a turbine section of an engine, such as the turbine section 150 of engine 100 of FIG. 1 in accordance with an exemplary embodiment. The turbine section 150 includes a turbine stator 200 and a turbine rotor 250 surrounded by a shroud 210 defining a gas flow path through which hot, combusted air from an upstream compressor section (e.g. combustion section 140 of FIG. 1) is directed. Although only one turbine stator 200 and one turbine rotor 250 are shown, such stators 200 and rotors 250 are typically arranged in alternating axially spaced, circumferential rows. As used herein, the term "axial" refers to a direction generally parallel to the engine centerline, while the term "radial" refers to a direction generally perpendicular to the engine centerline.

The rotor 250 generally includes rotor blades 260 (one of which is shown) mounted on a rotor disc (not shown), which in turn is coupled to an engine shaft (not shown). The turbine stator 200 directs the air toward the turbine rotor 250. The air impinges upon rotor blades 260 of the turbine rotor 250, thereby driving the turbine rotor 250 for power extraction. To allow the turbine section 150 to operate at desirable elevated temperatures, certain components are cooled, including the rotor 250 and the stator 200, as described in greater detail below.

Figure 3:
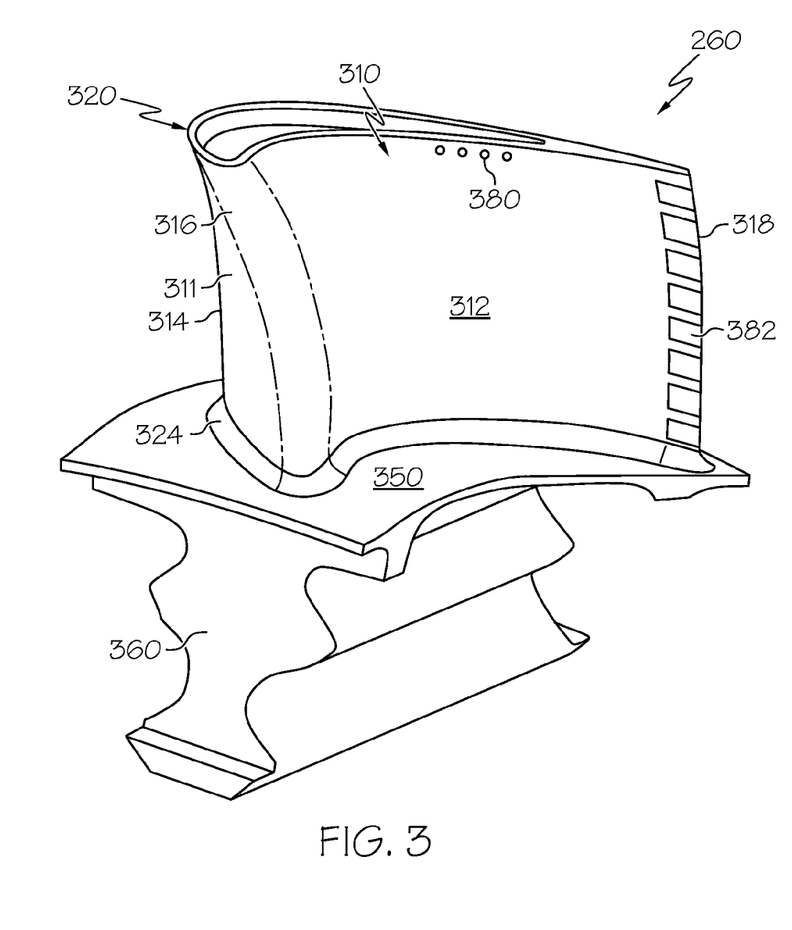
FIG. 3 is an isometric view of a turbine rotor blade of the turbine section of FIG. 2 in accordance with an exemplary embodiment.

FIG. 3 illustrates an exemplary aircraft jet engine turbine rotor blade, such as rotor blade 260 of FIG. 2, removed from a turbine section. FIG. 3 depicts one exemplary embodiment, and other exemplary embodiments may have alternate configurations or arrangements.

The rotor blade 260 includes an airfoil 310, a platform 350 and a root 360. The platform 350 is configured to radially contain turbine airflow within a shroud (e.g., shroud 210 of FIG. 2). The root 360 extends from the underside of the platform and is configured to couple the blade 260 to a turbine rotor disc (not shown). In general, the rotor blade 260 may be made from any suitable material, including high heat and high stress resistant aerospace alloys, such as nickel based alloys, Rene 88, Mar-M-247, single crystal materials, steels, titanium alloys or the like.

The airfoil 310 projects radially outwardly from the platform 350. The airfoil 310 is formed by a body 311 with two side (or outer) walls 312, 314 each having outer surfaces that together define an airfoil shape. The first side wall 312 defines a pressure side with a generally concave shape, and the second side wall 314 defines a suction side with a generally convex shape. In a chordwise direction, the airfoil side walls 312, 314 are joined at a leading edge 316 and trailing edge 318. As used herein, the term "chordwise" refers to a generally longitudinal dimension along the airfoil from leading edge to trailing edge, typically curved for air flow characteristics. The trailing edge 318 may include trailing edge slots 382, discussed below.

In an axial direction, the airfoil side walls 312, 314 extend from a base 324 at the platform 350 to a blade tip 320. In general, the blade tip 320 is positioned to rotate in close proximity to the shroud 210 (FIG. 2) in order to maximize energy extraction.

As noted above, the rotor blade 260, particularly the airfoil 310, is subject to extremely high temperatures resulting from high velocity hot gases ducted from the combustion section 140 (FIG. 2). If unaddressed, the extreme heat may affect the useful life of an airfoil and/or impact the maximum operating temperature of the engine. As such, cooling is provided for the airfoil 310 to maintain blade temperature at an acceptable level, as described in greater detail below. Such cooling may include an internal cooling system that directs cooling air from the compressor section 130 into inlets in the root 360 and through internal cavities and passages to cool the airfoil 310 via convection and conduction. The air flowing through the internal cooling system may flow out of the airfoil 310 through the trailing edge slots 382 to provide temperature control of the trailing edge 318. Additionally, the cooling air flowing through the internal cooling system may also be supplied to film cooling holes 380 arranged to provide a cooling film of fluid onto the surface of the airfoil 310. In FIG. 3, the film cooling holes 380 are positioned on the blade tip 320, although film cooling holes 380 may be provided in other locations, such as in the area of the leading edge 316 or at any chordwise location along the pressure side wall 312 and/or suction side wall 314.

Figure 4:
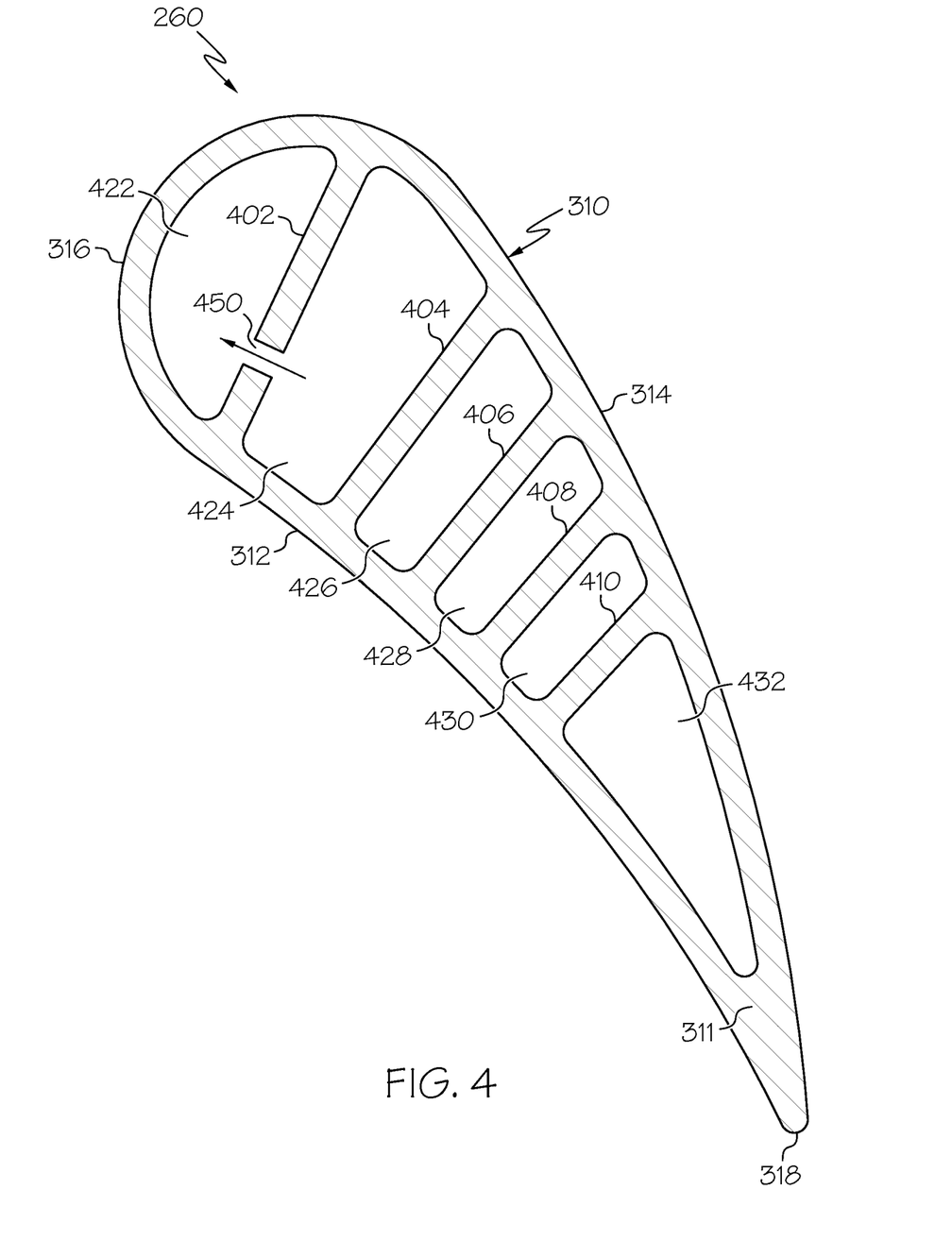
FIG. 4 is a cross-sectional view of an airfoil of the turbine rotor blade of FIG. 3 in accordance with an exemplary embodiment.

FIG. 4 is a cross-sectional view of the airfoil 310 of FIG. 3 in accordance with an exemplary embodiment. As shown, the cross-sectional view may generally correspond to a mid-span cross-sectional view through an axial-chordwise plane. As discussed above, the airfoil 310 of the rotor blade 260 includes the side walls 312, 314 joined at the leading edge 316 and the trailing edge 318. Although the airfoil 310 is described with respect to a turbine blade, the cross-sectional view of FIG. 4, as well as the cooling holes discussed below, may also refer to the airfoil of a stator.

As also noted above, the airfoil 310 may include an internal cooling system arranged in a cavity defined in the interior of the body 311. The internal cooling system is formed by one or more interior walls 402, 404, 406, 408, 410 that define a number of chambers (or cavities) 422, 424, 426, 428, 430, 432. As an example, the interior wall 402 defines a first chamber 422 with the leading edge 316 and a second chamber 424 with the side walls 312, 314. As a result of the geometry of the airfoil 310, particularly interior walls 402, 404, 406, 408, 410 and chambers 422, 424, 426, 428, 430, 432, cooling air flow may be directed to predetermined locations in and on the airfoil 310. In exemplary embodiments, the cooling circuit may form part of a high efficiency, multi-walled turbine airfoil cooling arrangement or a serpentine airfoil cooling arrangement. Other cooling circuit arrangements may be provided, including those of different wall and cavity structures.

As an example and as discussed in greater detail below, the interior wall 402 may define one or more holes 450 that direct air between the chambers 422, 424. In the depicted example, the hole 450 directs cooling air flow from chamber 424 to chamber 422 such that the cooling air impinges upon the leading edge 316 of the airfoil 310. As such, chamber 422 may be referred to as a leading edge chamber, and chamber 424 may be referred to as a supply chamber. Generally, the cooling air may be referred to as an impingement jet that strikes a target region on the interior surface of the leading edge 316, typically in an approximately perpendicular arrangement. The impingement cooling provides advantageous heat transfer characteristics in a localized, predetermined region. The holes 450 are described in greater detail below with reference to FIGS. 5-12.

Figure 5:
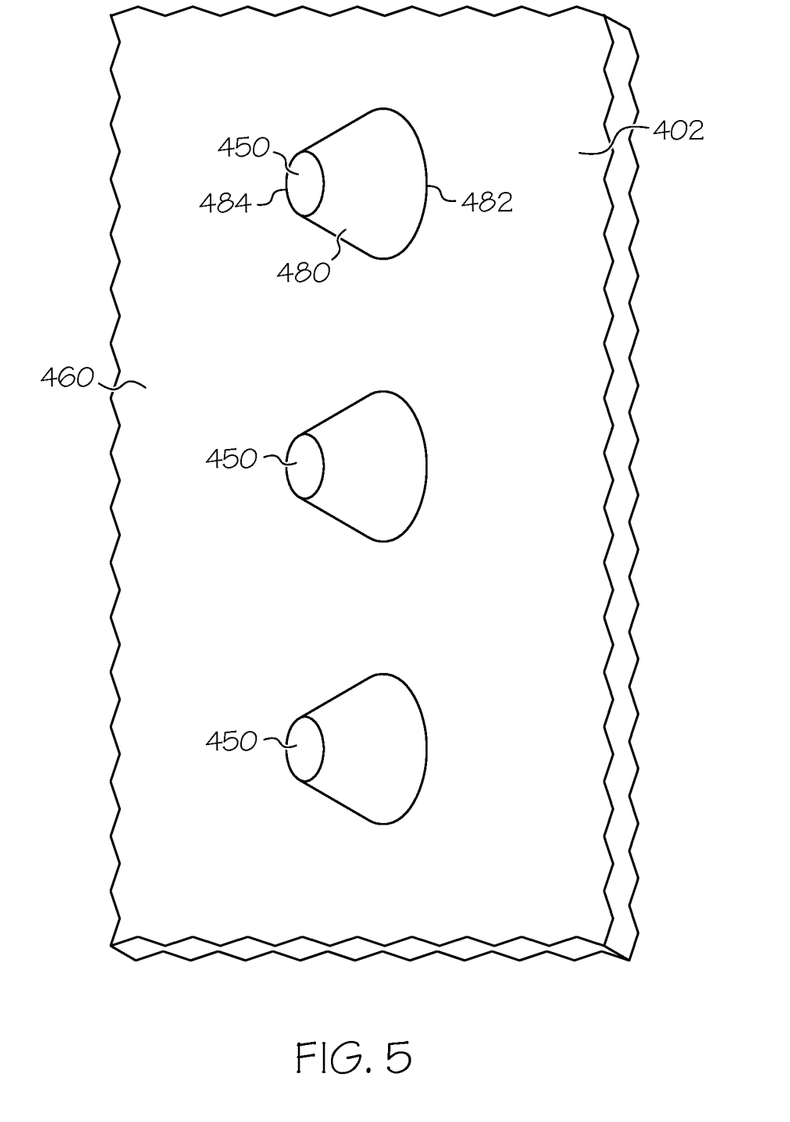
FIG. 5 is a partial isometric view of an interior wall of the airfoil of FIG. 4 in accordance with an exemplary embodiment.

FIG. 5 is a partial, isometric view of interior wall 402 a viewed from the leading edge chamber 422 (FIG. 4). In particular, FIG. 5 depicts the cooling holes 450. As shown in FIG. 5, the cooling holes 450 may be arranged in a generally radial row. However, any suitable arrangement of cooling holes 450 may be provided, including multiple rows or other patterns. Additional reference is made to FIG. 6, which is a cross-sectional view of one of the cooling holes 450.

Figure 6:
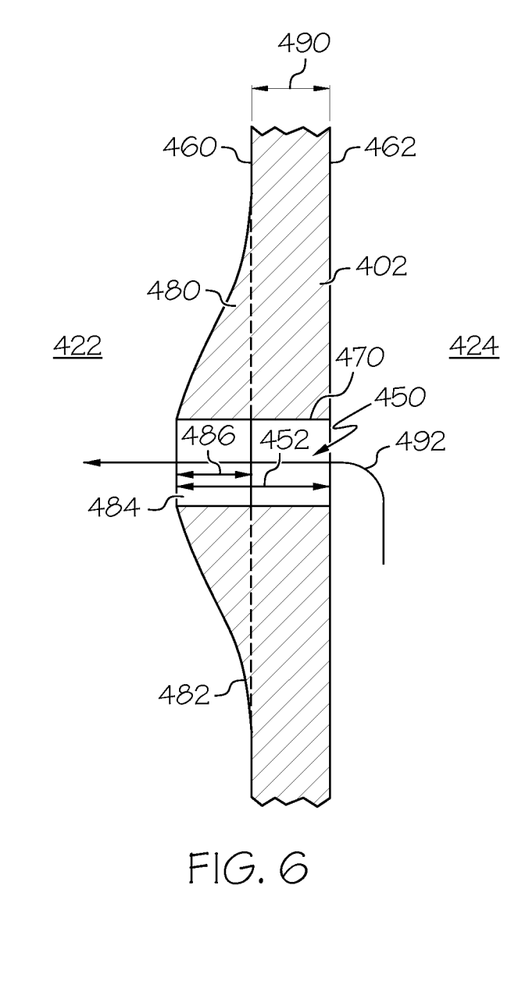
FIG. 6 is a cross-sectional view of a cooling hole of the interior wall of FIG. 5 in accordance with an exemplary embodiment.

Referring to FIGS. 5 and 6, each cooling hole 450 is defined in the interior wall 402. Generally, the interior wall 402 is planar with a first surface 460 facing the leading edge chamber 422 and a second surface 462 facing the supply chamber 424, and the interior wall 402 has a generally constant thickness 490 between first and second surfaces 460, 462 in most areas of the interior wall 402.

The cooling holes 450 may be defined in the interior wall 402 such that each cooling hole 450 has a base portion 470 substantially equal to the thickness between the first and second surfaces 460, 462 and a locally extended portion 480 that extends from the first surface 460. In general, the term "locally extending" refers to a portion of a respective cooling hole that extends off of the plane of the respective surface and transitions back to the surface for each individual cooling hole. In other words, adjacent holes are separated from one another by portions of the surface that are not extended, e.g. the "locally extended portions" are only associated with a single hole such that adjacent holes do not "share" extended portions that bridge that adjacent holes. Such an arrangement may provide the desired cooling characteristics discussed in greater detail below. Locally extending may also refer to "locally protruded" or "locally thickened" portions.

In the depicted exemplary embodiment shown in FIGS. 5 and 6, the locally extended portion 480 of the hole 450 is generally conical with a perimeter 482 and extends from the surface 460 to an apex 484 that defines the outlet of the hole 450. In the depicted exemplary embodiment, and as best shown by FIG. 5, the perimeter 482 is generally circular, although other shapes such as oval or irregular may be provided for the generally conical shape.

As best shown in FIG. 6, the cooling hole 450 may have a longitudinal axis that is perpendicular (e.g. approximately 90°) to the first and second surface 460, 462 such that impingement jets 492 flow from the cooling hole 450 at an angle of 90° to the surface 460. As a result of this arrangement, the length 452 of the cooling hole 450 may be approximately equal to the sum of thickness 490 of the wall 402 and the height 486 of the locally extended portion 480. This length enables the formation of improved impingement jets, as discussed below. Additionally, in this exemplary embodiment, the cross-sectional area of the hole 450 is generally constant along the length 452. However, as discussed in greater detail below, cooling holes may be provided with non-perpendicular characteristics, varying longitudinal axes, and/or varying cross-sectional areas.

The locally extended portion 480 of the cooling hole 450 may provide a number of advantages relative to conventional cooling holes. The increased length and corresponding length to diameter ratio improves the discharge coefficient of the hole 450. Additionally, this enables the optimization of the cooling holes to result in improved directional impingement control, hole spacing, and hole to target wall spacing, while minimizing weight gain, pressure drop, and blade pull load from the hub to the tip of the airfoil. Additionally, the locally extended portion 480 on the surface 460 may reduce the downstream cross flow degradation of the impingement jet 492 from the spent flow of impingement cooling air, which may otherwise significantly reduce the heat transfer from the leading edge 316. Such cross flow may otherwise function to reduce the desired direction and momentum toward the designated target region of the leading edge 316. In particular, the locally extended portion 480 prevents or mitigates cross flow in an area completely surrounding the hole.

Figure 7:
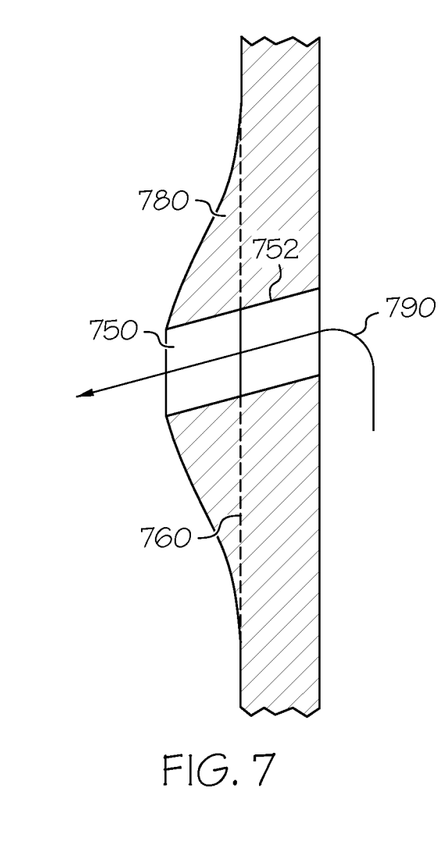
FIG. 7 is a cross-sectional view of a cooling hole of the interior wall in accordance with an alternate exemplary embodiment.

As noted above, the cooling hole 450 depicted in FIG. 6 is generally orthogonal of the first and second surfaces 460, 462, although other arrangements may be provided. As an example, FIG. 7 is a cross-sectional view of a cooling hole 750. Unless otherwise noted, that cooling hole 750 may have characteristics similar to those discussed above and/or below. In this exemplary embodiment, the cooling hole 750, including a base portion 752 and a locally extended portion 780, is arranged such that the impingement jet 790 is angled relative to the surface 760. As such, the directionality of the impingement jet 790 may be modified as necessary and/or desired.

Figure 8:
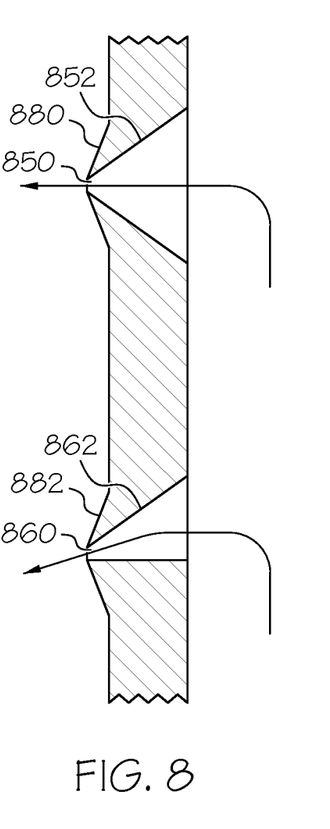
FIG. 8 is a cross-sectional view of a cooling hole of the interior wall in accordance with an alternate exemplary embodiment.

As noted above, the cooling hole 450 depicted in FIG. 6 has a generally constant cross-sectional area, although other arrangements may be provided. As examples, FIG. 8 is a cross-sectional view of cooling holes 850, 860. Unless otherwise noted, that cooling holes 850, 860 may have characteristics similar to those discussed above and/or below. In this exemplary embodiment, the cooling hole 850, including a base portion 852 and a locally extended portion 880, is arranged such that the cross-sectional area along the hole 850 varies from inlet to outlet. In this embodiment, the variation of the cross-sectional area of the hole 850 is symmetric along the length. Like hole 850, hole 860 includes a base portion 862 and a locally extended portion 882, arranged such that the cross-sectional area along the hole 860 varies from inlet to outlet. However, unlike hole 850, hole 860 has a cross-sectional area that asymmetrically varies. As shown, the cooling holes 850, 860 have cross-sectional areas that converge to accelerate the cooling air flowing therethrough. In other embodiments, the cooling holes may have cross-sectional areas that diverge.

The cross-sectional area of the cooling hole, including interior, inlet, and outlet areas, may be selected as necessary or desired to provide the desired cooling characteristics. As examples, the cooling hole may have circular, non-circular, oval, racetrack (e.g., a rectangular shape with rounded edges), and/or asymmetric cross-sectional areas. Additionally, the aspect ratio (e.g., the ratio of two orthogonal dimensions of the cross-sectional area) of the cooling holes may be varied to provide optimal cooling flow.

Figure 9:
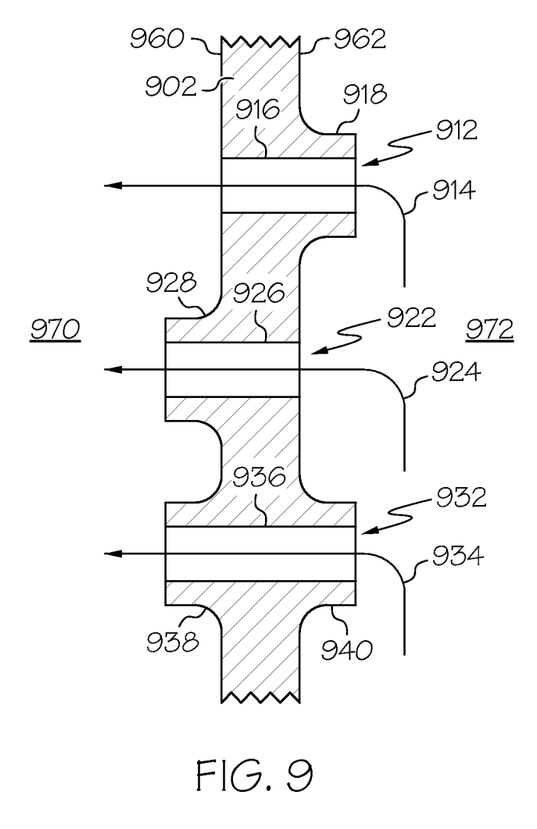
FIG. 9 is a cross-sectional view of a cooling hole of the interior wall in accordance with an alternate exemplary embodiment.

FIG. 9 is a cross-sectional view of cooling holes 912, 922, 932 that may be incorporated into the airfoil (e.g., airfoil 310) discussed above to direct impingement jets 914, 924, 934 through an interior wall 902 to the leading edge (e.g., leading edge 316) in accordance with alternate exemplary embodiments. As shown, the cooling holes 912, 922 may have respective base portions 916, 926 and respective locally extending portions 918, 928 arranged on the first surface 960 and/or second surface 962. For example, cooling hole 922 has a locally extending portion 928 extending from the first surface 960 facing the leading edge chamber 970, which is similar to the cooling hole 450 discussed in reference to FIGS. 5 and 6. In contrast, cooling hole 912 has a locally extending portion 918 extending from the second surface 962 to receive air from the supply chamber 972. As such, in this embodiment, the cooling hole 912 has the locally extended portion 918 at the inlet of the hole 912 instead of the outlet of the hole 912. As a further exemplary embodiment, the cooling hole 932 has a base portion 936 and locally extended portions 938, 940 on both of the surfaces 960, 962, e.g., at the inlet and outlet of the cooling hole 932. As such, the cooling holes 912, 922, 932 may prevent and/or mitigate inlet and/or outlet cross flow.

As additionally shown by FIG. 9, the cooling holes discussed herein may have non-conical shapes. For example, the locally extended portions 918, 928, 938, 940 have generally cylindrical shapes with tapered or fillet bases. Other shapes may be provided, as discussed in greater detail below.

Figure 10:
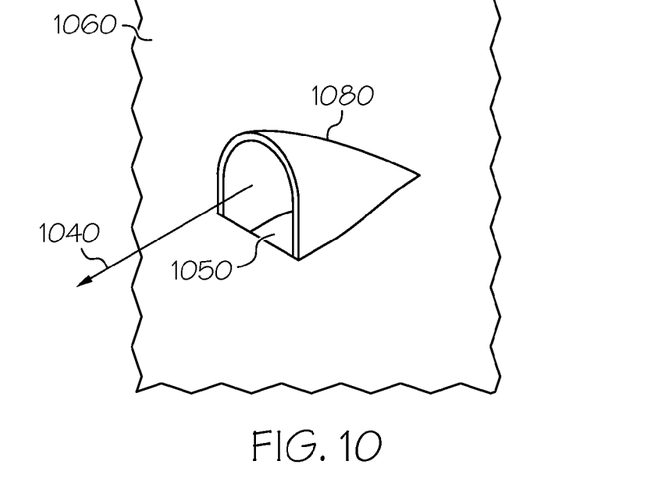
FIG. 10 is a partial isometric view of an interior wall in accordance with an alternate exemplary embodiment.
Figure 11:
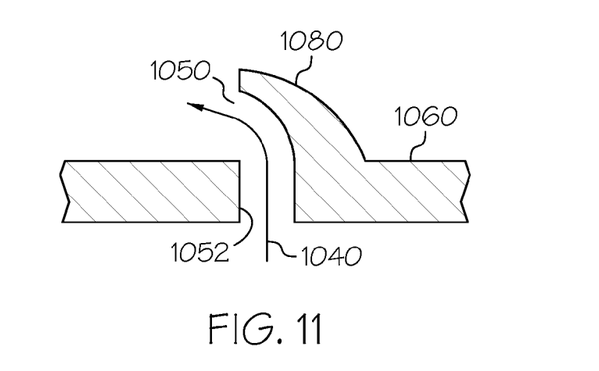
FIG. 11 is a cross-sectional view of a cooling hole of the interior wall of FIG. 10 in accordance with an exemplary embodiment.

FIG. 10 is an isometric view of a cooling hole 1050 in accordance with a further exemplary embodiment, and FIG. 11 is a cross-sectional view of the cooling hole 1050 of FIG. 10. The cooling hole 1050 includes a base portion 1052 and a locally extended portion 1080. In this exemplary embodiment, the locally extended portion 1080 is positioned on the first surface 1060, e.g., the outlet surface facing the leading edge chamber, and is generally scoop-shaped. In other words, the locally extended portion 1080 is primarily positioned on one side of the base portion 1052 to direct the impingement jet 1040 in the designated direction.

Figure 12:
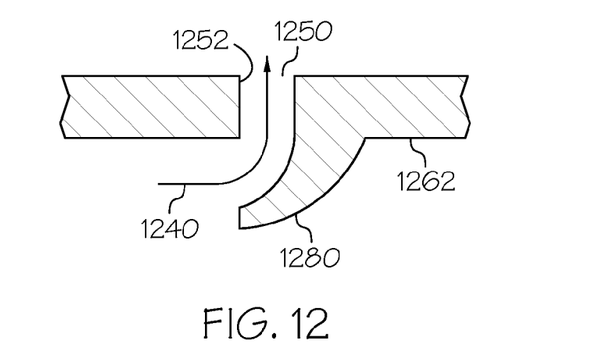
FIG. 12 is a cross-sectional view of a cooling hole of the interior wall in accordance with an alternate exemplary embodiment.

FIG. 12 is a cross-sectional view of a cooling hole 1250 in accordance with a further exemplary embodiment. The cooling hole 1250 includes a base portion 1252 and a locally extended portion 1280. In this exemplary embodiment, the locally extended portion 1280 is scoop-shaped, such as the locally extended portion 1080 shown in FIG. 10; however, the locally extended portion 1280 extends from the second surface 1262, e.g., the inlet surface facing the supply chamber. In other words, the locally extended portion 1280 is primarily positioned on one side of the base portion 1252 to direct the impingement jet 1240 from the supply chamber into the cooling hole 1250.

Accordingly, turbine rotors with improved airfoil cooling are provided. Exemplary embodiments of the turbine airfoil discussed above have resulted in an ability to increase engine temperature, thereby improving fuel consumption and power density. The airfoils may be produced by any suitable manufacturing techniques, including casting, injection molding, and/or rapid prototyping. Computational fluid dynamic (CFD) analysis can additionally be used to optimize the location and orientation of the cooling holes to provide advantageous inlet and exit field conditions and regional cooling. Exemplary embodiments promote the service life and/or enhanced performance in a cost-effective manner. Each of the exemplary embodiments discussed above may be used in combination with one another. The turbine airfoils produced according to exemplary embodiments may find beneficial use in many industries including aerospace, but also including industrial applications such as electricity generation, naval propulsion, pumping sets for gas and oil transmission, aircraft propulsion, automobile engines, and/or stationary power plants.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. An airfoil for a gas turbine engine, comprising:
   a body comprising a leading edge, a trailing edge, a pressure side wall extending between the leading edge and the trailing edge of the airfoil, and a suction side wall extending between the leading edge and the trailing edge of the airfoil, wherein the body defines an interior cavity; and
   an interior wall disposed within the interior cavity of the body and extending between the first wall and the second wall to define a supply chamber and a leading edge chamber,
   wherein the interior wall defines a first cooling hole with a first base portion and a first locally extended portion completely surrounding the first cooling hole and a second cooling hole being adjacent to the first cooling hole in a radial row of cooling holes in the interior wall, the second cooling hole having a second base portion and a second locally extended portion completely surrounding the second cooling hole, the first and second cooling holes configured to direct cooling air from the supply chamber to the leading edge chamber such that the cooling air impinges upon the leading edge, wherein the first and second locally extended portions are separated at a respective distance from each of the pressure and suction side walls and are separated from one another.

2. The airfoil of claim 1, wherein the first cooling hole has a generally oval cross-sectional shape.

3. The airfoil of claim 1, wherein the first cooling hole has a non-circular cross-sectional shape.

4. The airfoil of claim 1, wherein the interior wall has a first surface facing the leading edge chamber and a second surface facing the supply chamber, and wherein the first locally extended portion extends from the first surface.

5. The airfoil of claim 1, wherein the interior wall has a first surface facing the leading edge chamber and a second surface facing the supply chamber, and wherein the first locally extended portion extends from the second surface.

6. The airfoil of claim 1, wherein the first locally extended portion is generally cylindrical.

7. The airfoil of claim 1, wherein the interior wall has a first surface facing the leading edge chamber and a second surface facing the supply chamber, and wherein the interior wall further comprises a scoop that extends from the second surface adjacent to the first cooling hole.

8. The airfoil of claim 1, wherein the first cooling hole has a nonperpendicular central axis.

9. The airfoil of claim 1, wherein the first cooling hole has a varying cross sectional area.

10. An airfoil for a gas turbine engine, comprising:
a body comprising a leading edge, a trailing edge, a pressure side wall extending between the leading edge and the trailing edge of the airfoil, and a suction side wall extending between the leading edge and the trailing edge of the airfoil, wherein the body defines an interior cavity; and
an interior wall disposed within the interior cavity of the body and extending between the first wall and the second wall to define a supply chamber and a leading edge chamber,
wherein the interior wall defines a cooling hole with a base portion and a locally extended portion to direct cooling air from the supply chamber to the leading edge chamber such that the cooling air impinges upon the leading edge, and
wherein the locally extended portion is generally conical, and wherein the locally extended portion has a generally circular perimeter.

11. A gas turbine engine, comprising:
a compressor section configured to receive and compress air;
a combustion section coupled to the compressor section and configured to receive the compressed air, mix the compressed air with fuel, and ignite the compressed air and fuel mixture to produce combustion gases; and
a turbine section coupled to the combustion section and configured to receive the combustion gases, the turbine section defining a combustion gas path and comprising a turbine rotor positioned within the combustion gas path, the turbine rotor comprising
a platform at least partially defining the combustion gas path; and
an airfoil extending from the platform, the airfoil including a leading edge, a trailing edge, and side walls defining a body with an interior cavity, the airfoil further comprising an interior wall disposed within the interior cavity of the body and extending between the side walls to define a supply chamber and a leading edge chamber,
wherein the interior wall defines a first cooling hole with a first base portion and a first locally extended portion completely surrounding the first cooling hole and a second cooling hole being adjacent to the first cooling hole in a radial row of cooling holes in the interior wall, the second cooling hole having a second base portion and a second locally extended portion completely surrounding the second cooling hole, the first and second cooling holes configured to direct cooling air from the supply chamber to the leading edge chamber such that the cooling air impinges upon the leading edge, wherein the first and second locally extended portions are separated at a respective distance from each of the first and second side walls and are separated from one another.

12. The gas turbine engine of claim 11, wherein the first locally extended portion is generally conical, and wherein the first locally extended portion has a generally circular perimeter.

13. The gas turbine engine of claim 11, wherein the interior wall has a first surface facing the leading edge chamber and a second surface facing the supply chamber, and wherein the first locally extended portion extends from the first surface.

14. The gas turbine engine of claim 11, wherein the interior wall has a first surface facing the leading edge chamber and a second surface facing the supply chamber, and wherein the interior wall further comprises a scoop that extends from the second surface adjacent to the first cooling hole.

* * * * *